June 9, 1959 — L. S. RUSSELL, JR — 2,889,942
BIN AND UNLOADING MECHANISM
Filed May 6, 1957
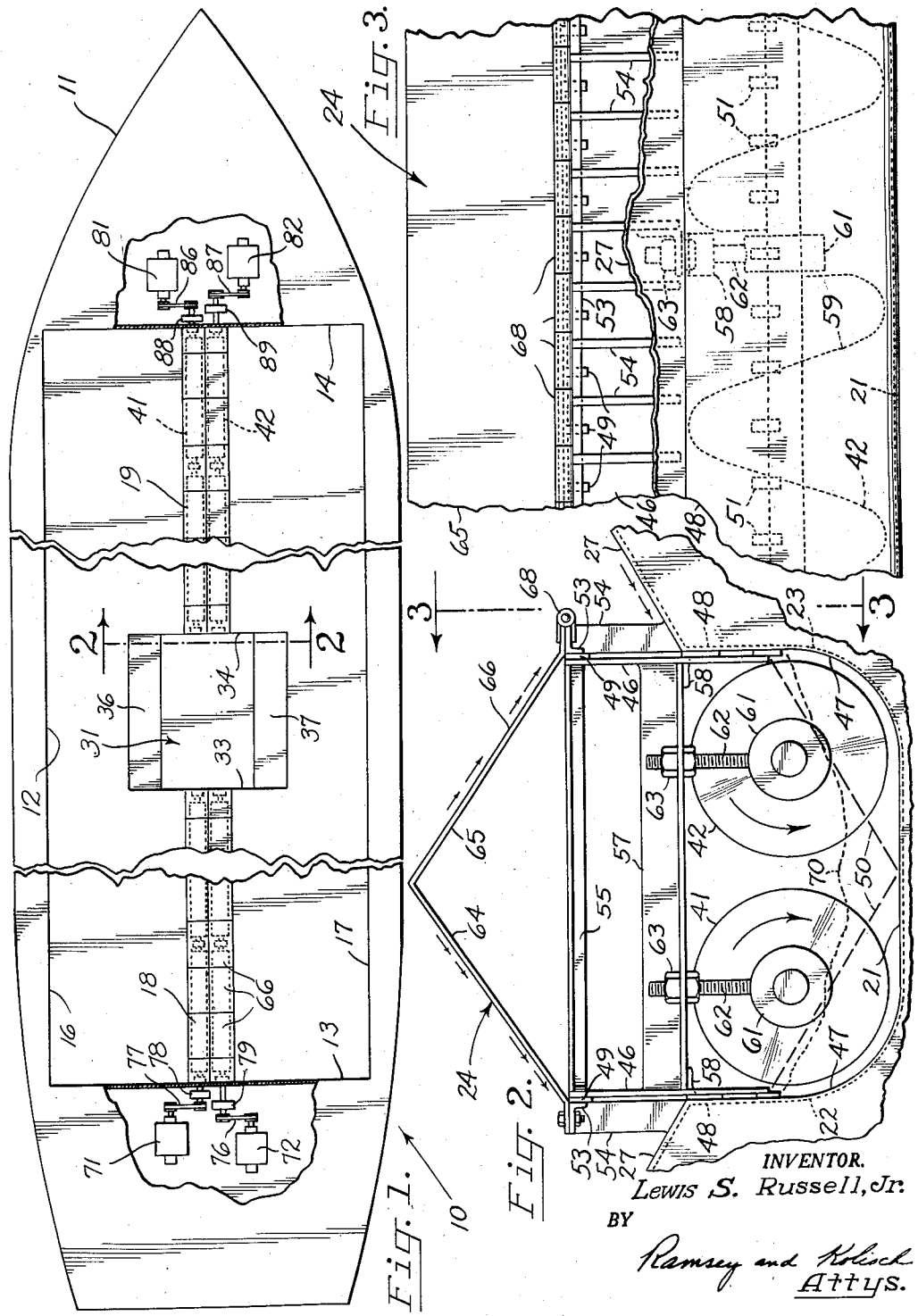
INVENTOR.
Lewis S. Russell, Jr.
BY
Ramsey and Kolisch
Attys.

United States Patent Office 2,889,942
Patented June 9, 1959

2,889,942
BIN AND UNLOADING MECHANISM
Lewis S. Russell, Jr., Portland, Oreg.
Application May 6, 1957, Serial No. 657,369
12 Claims. (Cl. 214—15)

This invention relates to a material storage bin and unloading mechanism and more particularly to a storage bin adapted to handle particulate matter such as grain, salt, and the like, having an unloading mechanism incorporated with the bin operable to transport material from the bin in regulated quantities over a large expanse of the bin without the requirement of constant supervision and without appreciable degradation or breakdown of the product handled.

This invention has particular utility and advantages in connection with barges, ships, and other cargo vessels. Grain barges, for instance, are commonly used to transport grain from one locality to another because of their economy and large capacity. With a barge or other vessel which is buoyed on the water, it is important that cargo be unloaded from areas distributed throughout the cargo space of the barge in order to control listing or tilting of the vessel either to port or starboard and heeling over the vessel at its bow or stern end. Further, since a barge or cargo vessel usually represents a fairly large capital outlay, to realize greatest productivity, it is desirable that the unloading time for the cargo transported be reduced to a minimum. Cargo vessels constructed according to this invention have a number of outstanding advantages which include the ability to stay in trim without undue listing or heeling during unloading, a substantial reduction in unloading time, and a reduced need for supervision during the unloading operation.

Generally, a barge or cargo vessel constructed according to this invention is equipped with a bin or hold having an elongated unloading or conveyer tunnel at the base of the bin extending longitudinally of the vessel along substantially its center. The hold or bin is provided with an inclined bottom or base which slopes downwardly as it extends inwardly from the outer sides of the bin. The bin is located over the keel of the vessel, with the storage space of the bin evenly distributed to either side of the keel.

The conveyor tunnel is characterized by a novel construction whereby material carried in the bin is fed into the conveyor tunnel from both sides of the bin from areas distributed throughout the length of the tunnel. The material is discharged from the tunnel by discharge mechanism located inside the tunnel. The discharge mechanism within the tunnel includes a pair of conveyer screws arranged side by side and extending substantially the length of the tunnel. Feed slots arranged longitudinally along the sides of the tunnel provide entry for material into the tunnel. The top or cover portion of the conveyor tunnel functions to direct the contents of the bin into the feed slots and prevents the contents from falling around and completely engulfing the conveyor screws.

Of prime importance in preventing lockup or jamming of the conveyer screws is the arrangement of the discharge mechanism within the tunnel. It has been found that these effects may be controlled by the use of conveyer screws spaced adjacent each other so that upon rotation of the screws, they act in concert to move as a mass material deposited between the screws. By employing a pair of screws in this manner, when the screws are started up after an interval of shutdown, each of the screws assists the other one in overcoming the inertia effect of the material lodged around and between the screws. The arrangement of the feed slots prevents an excessive amount of accumulation of material around the conveyer screws. Also, when a pair of screws are used, the through-put volume of the screws is considerably in excess of that possible using each of the screws independently. As a corollary, it has been found that the power required to rotate the screws during their operation is considerably less than the power required with other arrangements.

In addition to resisting lockup or jamming of the screws and reducing the power requirement for moving a given mass of material, by employing a pair of screws operating in concert, degradation or destruction of the material handled is practically eliminated. The reduced power requirement probably is attributable to reduced friction loss within the conveyer tunnel which is more or less proportional to the breakup or degradation occurring in the material. Reduced abrading action and degradation of the material handled is highly important, particularly with materials such as grain or salt whose value is reduced by degradation.

A metering channel is provided for each of the feed slots which co-operates with the feed slot in controlling the entry of material into the conveyer tunnel. These metering channels open at their upper ends to the storage space of the bin and communicate at their lower ends with the feed slots, thus to provide a path for the material from the bin to the conveyer tunnel. In addition to regulating the flow rate of material, the metering channels serve to reduce the buildup of material in the conveyer tunnel under the feed slots so as to further reduce lockup or jamming tendencies of the conveyer screws. The resistance offered the flow of material by the metering channels compensates for the pressure effect created by the existence of a full load of material within the bin. The walls of the metering channels are spaced a uniform distance apart throughout the height of the channels to prevent material from wedging into and plugging up the channels.

A highly important feature of this invention is the inclusion above the metering channels of a series of control bars spaced at regular intervals transversely across the upper ends of the metering channel. The control bars thus form a grid system operable to sift material entering the metering channels and conveyer tunnel. These control bars help assure a continuous flow of material downwardly through the metering channels. They also assist in preventing damage to the moving parts inside the tunnel.

A further feature of this invention is the provision of leveler bars projecting downwardly into the conveyer tunnel below the feed slots. The leveler bars function to level out the waves set up in the material by the action of the conveyer screws. When material is moved past a leveler bar, a small void space in the material is cleared apart by the action of the leveler bar next to the mouth of the feed slot. The space created enables a small amount of material to flow into the conveyer tunnel from the feed slot. The leveler bars are spaced at intervals along the length of the conveyer tunnel so that when the conveyer screws are operating, material flows continuously into the tunnel from areas distributed throughout the length of the tunnel.

In a cargo vessel constructed according to this invention, it is highly desirable that a pair of conveyer tunnels be employed. These tunnels are aligned over the keel of the vessel with one towards the bow end and one towards the stern end of the vessel. The conveyer screws within the tunnel are driven so that they discharge material into an unloading pit or recess located between the inner ends of the tunnels somewhere near the center of the vessel. Undue listing from side to side is taken care of by aligning the conveyer tunnels over the keel of the vessel and constructing the bottom of the bin so that grain or other material tends to fall into the tunnels from both sides of the vessel. Heeling over of the ship at its bow or stern end may then be taken care of by regulating the operation of the conveyer screws in the two conveyer tunnels. The provision of a single unloading pit or recess located in the center of the vessel enables the vessel to be unloaded entirely from one central point.

Generally, therefore, it is an object of this invention to provide an improved bin and unloading mechanism for grain, salt, and other particulate matter, so constructed and arranged that the contents of the bin may be discharged by the unloading mechanism from areas distributed throughout the bin whereby the entire bin may be unloaded without the necessity of constant supervision or the use of manually operable gates, valves, or other arrangements controlling the operation of the unloading mechanism.

It is a related object of this invention to provide such a bin and unloading mechanism wherein the unloading mechanism may be stopped at intervals when desired without the danger of locking up or jamming the unloading mechanism.

Yet another object of this invention is to provide such a bin and unloading mechanism wherein the material contained in the bin is discharged from the bin without excessive degradation, breakdown, or eroding of the material.

Further, it is an object of this invention to provide for a cargo vessel or barge a bin or hold having conveying mechanism so constructed that as material is unloaded, the vessel may be kept in trim at all times without undue listing from port to starboard, and to provide such a bin and unloading mechanism wherein heeling over of the vessel at its bow or stern end may be readily controlled.

These and other objects and advantages are attained by the present invention described hereinbelow in conjunction with the accompanying drawings wherein:

Fig. 1 is a top view of a grain barge embodying this invention, with parts broken away to illustrate construction features of the barge;

Fig. 2 is a section view along the line 2—2 in Fig. 1, illustrating the placement of the conveyer screws and the arrangement of the metering channels and feed slots with respect to these conveyer screws; and Fig. 3 is a section view along the line 3—3 in Fig. 2, illustrating one of the conveyer tunnels of this invention in more detail and the control bars and the leveler bars used for controlling the flow of material according to this invention.

Referring to the drawings wherein an embodiment of this invention is illustrated, and particularly to Fig. 1, 10 indicates a grain barge generally, having a conventional hull or body 11, and a hold or bin 12 extending longitudinally of the vessel. The invention is described in connection with a grain barge, although it should be obvious that with suitable modification, the barge could be constructed to handle other types of particulate matter. The hold is located over the keel for the vessel with the storage space of the hold evenly distributed to either side of the keel. The hold or pin is comprised of end walls 13 and 14 and side walls 16 and 17 which may extend vertically upwardly from the bottom of the bin as shown or incline inwardly toward each other progressing downwardly in the hold so as to conform generally to the sides or other structural features of the vessel. A covering (not shown) normally is included over the top of hold 12 to protect the contents of the hold from the weather.

Longitudinally along the vessel at the base of the hold 12 and substantially over the keel of the vessel are a pair of elongated conveyer tunnels 18 and 19, respectively. As can best be seen in Fig. 2, each of these conveyer tunnels is comprised of a floor portion 21, side wall portions indicated at 22 and 23 defining the lateral expanse of the conveyer tunnel, and an overlying hood structure 24. Bin or hold 12 is provided with a bottom 27 which inclines upwardly and outwardly from the conveyer tunnels to meet side walls 16 and 17. Bottom 27 presents a continuous incline from the sides of the bin to the conveyer tunnels 18 and 19. Bottom 27, sloping downwardly from the sides of the hold, directs grain carried at the sides of the barge centrally of the barge toward the conveyer tunnels.

Intermediate the conveyer tunnels 18 and 19 and approximately midway between the bow and stern of the barge is a collection pit or recess 31. Recess 31 collects material ejected from the inner ends of conveyer tunnels 18 and 19. The pit or recess includes a horizontal floor or base 32 located beneath the level of floors 21 of the conveyer tunnels, end walls 33, 34 which extend vertically downwardly at opposite ends, respectively, of the pit, and inclined side walls 36 and 37. In practice, when the barge is unloaded, conventionally either a bucket-type conveyer known as a "marine leg" or a suction-type conveyer utilizing air suction (known as a "sucker") is introduced into the hold over pit 31, and material is transferred from the barge to storage facilities outside the barge by the removal of material from pit 31. By unloading the barge from a single point located centrally in the vessel, shifting of the barge relative to the unloading facilities carried by the dock site is eliminated.

Each of the conveyer tunnels has a pair of conveyer screws such as screws 41 and 42, arranged side by side and parallel to each other within the tunnel and extending substantially the length of the tunnel. As can be seen best in Fig. 2, the screws are placed relatively closely to each other so that the screws will co-operate with each other and act in concert in moving material deposited between the screws. In the handling of grain, for instance, with 14" diameter screws, good results were obtained using a spacing between the screws of about 2½ inches or less. Optimum spacing depends on such factors as the cohesiveness of the material handled, the particle size, etc.

As best seen in Fig. 2, side wall portions 22 and 23 of each conveyer tunnel are each comprised of an upper plate portion 46, which extends along the length of the tunnel and terminates at its lower end adjacent the outer side of one of the conveyor screws, and a lower plate portion 47 co-extensive in length with upper plate portion 46. The upper end of lower plate portion 47, indicated at 48, overlaps the lower end of upper plate portion 46 and is parallel therewith while spaced a small distance laterally outside of the upper plate portion. Plate portions 47 progress downwardly from where they overlap plates 46 and curve inwardly about a conveyor screw until they join floor 21 which, in the embodiment illustrated, is integral with plate portions 47. The overlap of plate portions 46 and 47 form an elongated metering channel, of uniform width throughout the height of the channel, along each side of each conveyor tunnel and extending the length of the tunnel. The lower edges of plates 46 form with plates 47 elongated feed slots delivering material into the conveyor tunnel.

As may be seen in Fig. 2, the feed slots are spaced above floor 21 at about the same height as the axial centers of screws 41, 42 so that grain, in falling from the feed slots, will cover up less than half, and preferably about one-third, of the conveyor screws after the grain assumes its natural angle of repose in falling from the feed slots, as indicated by the dotted straight lines 50 in Fig. 2. The metering channels formed by the overlap of plates 46 and 47 function to meter the flow of grain into the feed slots and reduce the effect of the pressure head covered by a full load of grain which might otherwise cause overloading of the conveyor screws. With grain, metering channels about ½ inch in width and about 6 to 8 inches in height were found to be quite satisfactory. The channels are made of uniform width throughout their height to prevent wedging up of grain in the channels and a clogging of the channels.

Secured at intervals along the top and bottom edges of each upper plate portion 46 are a series of spacer elements, upper spacer elements 49 and lower spacer elements 51, respectively. Lower spacer elements 51 are affixed to plate portions 47 and serve to set apart the plates forming the metering channels. Upper spacer elements 49 are affixed at their outer edges to an angle iron 53 which in turn is supported on a series of control bar members 54. Bar members 54 are affixed at their lower ends to bottom 27 of the bin and serve to brace members 53 in position on either side of the conveyor tunnel. Bar members 54 extend vertically downwardly, as shown in Fig. 2, between member 53 and bottom 27 so that they lie across the mouth of the metering channel formed between plates 46 and 47 and intercept material flowing into the metering channel. Thus, the control bar members form a grid network above the upper end of each metering channel. This grid formation, best illustrated in Fig. 3, serves to sift out foreign objects which otherwise might lodge inside the channel between walls 46 and 47 or fall into the path of the conveyor screws and thereby damage the screws, and also provides a safety grid protecting personnel operating the conveyor tunnels. The lateral spacing of the control bar members depends upon the particular type of material handled. With a grain barge, for instance, a spacing of from 2 to 8 inches between the members has been found to be highly practical.

Upper plate members 46 are spaced apart and rigidized by bracing members 55, which may be comprised of angle irons or the like, extending between the upper edge of the members.

Conveyor screws 41 and 42 are mounted inside each conveyor tunnel on a series of crossbeams such as crossbeam 57 in Fig. 2. These crossbeams may be fixed in the tunnel in any suitable manner as by brackets 58 secured to the lower edges of the crossbeams and the inner surfaces of plate members 47, respectively. Suitable openings are made in plate members 47 to accommodate the insertion of the brackets through the plate members. Referring to Fig. 3, flights 59 of the conveyor screws are interrupted at intervals to accommodate bearing members 61 supporting the center shaft for the screws and mounted on crossbeams 57 as by studs 62 and nuts 63.

Hood structure 24 over the top of each of the conveyor tunnels is designed to form a supressor shielding the screws in the tunnel from becoming enveloped in grain and deflecting material in the bin outwardly to the lateral sides of the tunnel. As shown, the hood structure is comprised of a series of cover members 66 each having a pair of surface plate members 64 and 65 which are inclined relative to each other and extend downwardly from a ridge formed where the plate members join with each other, outwardly to either side of the conveyor tunnel. Each of the cover members may be removed from over the top of the conveyor tunnel. The provision of a series of cover members, each removable independently of the others from the top of the conveyor tunnel, is highly desirable in the event that certain portions of the conveyor tunnels become clogged or jammed during use. Preferably each of the cover members is hinged at one of its edges to one of the angle irons 53, as by hinge 68, to permit the cover member to be swung outwardly over to one side of the tunnel. The other edge of each of the cover members ordinarily would be detachably secured to the other of the angle irons 53, as by nut and bolt 69, or a similar clamping means.

Screws 41, 42 of each conveyor tunnel are rotated against the flow of material entering the conveyor tunnel through the feed slots along the side of the tunnel as indicated by the arrows in Fig. 2. The flights of screws are configured so that when the screws are rotated in this direction, material moves down each conveyor tunnel into pit or recess 31. By rotating the screws against the flow of grain from the feed slots, excessive buildup of grain within the tunnel is prevented, the grain carried by the screws tending to be forced up into the feed slots so as to choke off the flow of new grain into the conveyer tunnel.

It will be noted that lower spacer members 51 protrude below the feed slots, i.e., below the bottom edge of plate 46, into the conveyor tunnel. This is a highly important feature of this invention. The conveyer screws, in moving material through the conveyor tunnels, tend to set up waves in the material. The lower ends of spacer members 51 tend to level out these waves, acting as leveler members and creating small void spaces adjacent the lower ends of the members on the outfeed side of the members. The void spaces created enable grain to flow into the tunnel in regulated quantities on the outfeed side of each of the leveler members. Thus, the leveler members tend to create a flow of grain into the conveyer tunnel in regulated amounts throughout the length of the tunnel.

Referring to Fig. 2, the dotted wavy line 70 indicates the level of grain in one of the tunnels after a period of operation of the conveyor screws. The screws are rotated against the flow of grain from the feed slots which minimizes the buildup of material between the conveyor screws. However, some material becomes lodged intermediate the conveyor screws from sticking to the flights of the screws or riding up over the center shafts for the screws. When the screws are stopped and then started up again, the inertia effect of this material intermediate the screws is overcome by reason of the fact that screws 41, 42 act in concert in moving material between the screws downwardly through the conveyor tunnel.

Power mechanism is provided for rotating the conveyer screws in the direction illustrated. In the embodiment illustrated, electric motors 71 and 72 are connected by belt connections 76, 77 and speed reducers 78, 79 to the center shafts for the conveyer screws in tunnel 18. Similarly, electric motors 81, 82 are connected by belt connections 86, 87 and speed reducers 88, 89 to the center shafts for the conveyer screws in tunnel 19. The electric motors are variable drive motors of the conventional sort so that the speed of rotation of the screws varies depending upon the resistance encountered by the screws and the amount of material handled by the screws. Thus, the screws are rotated at a slower speed with a heavier load than with a light one. As conventional with motors of this sort, the motors are provided with overload relays so that when the motors encounter a certain maximum load, the motors are stopped by the overload relays.

In unloading a barge, material discharged through the conveyer tunnels is dumped into pit or recess 31 from whence it is unloaded from the vessel by suitable unloading means such as the "sucker" or "marine leg" described hereinabove. Should for any reason the unloading means cease to operate, the buildup of material within pit 31 eventually causes material to back up in the conveyer tunnels until the maximum load for the motors driving the conveyer screws is reached. The overload relays of motors 71, 72, 81, 82 preferably are set so that they stop the motors turning the conveyer screws before tunnels 18 and 19 are permitted to fill up to any appreciable degree. When the unloading means is started up again, pit 31 is emptied, permitting material to fall out of the inner ends of the conveyer tunnels into the pit, thereby to open up the conveyer tunnels.

It will be noted that in the embodiment illustrated, the barge is equipped with a pair of conveyer tunnels terminating in a central pit or sump. Also, the conveyer tunnels are located substantially along the axial center, or over the keel, of the ship with the bottom walls of the bin or hold sloping continuously from the outer sides of the hold downwardly to the conveyer tunnels. The bin is also proportioned so that the storage space of the bin is evenly distributed to either side of the keel of the vessel. As can be seen by referring to Figs. 1 and 2, each of the conveyer tunnels constitute along its length the only unloading passage means for the bin between the lateral sides of the bin, and each conveyer tunnel has a cross section of relatively minor size compared to the cross section of the bin. By such a construction, the vessel may readily be kept in trim during unloading. Undue listing of the vessel either to port or starboard cannot occur because material falls evenly into the conveyer tunnels from both sides of the vessel.

While it has been found that the conveyer tunnels of this invention are operable to remove material evenly and continuously throughout the length of the tunnels, occasionally, due to caking or other phenomena, portions of one of the conveyer tunnels may become partially clogged. Were a single conveyer tunnel used extending the entire length of the vessel, partial clogging of the tunnel would cause appreciable difficulty due to heeling over of the vessel at its bow or stern. To obviate this difficulty, a pair of tunnels have been employed with a central collection pit or recess 31. This affords the opportunity to balance the vessel from heeling over at its ends. For instance, should the conveyer tunnel to the left side of pit 31 in Fig. 1 become inoperative, this tunnel could be freed working backwardly from the discharge end of that tunnel and the conveyer tunnel to the right side of the pit operated as needed to keep the vessel in trim.

It will be seen that this invention has a number of advantages heretofore unknown. By the combination of a pair of conveyer screws operating in concert and the metering channels and feed slots described, applicant has devised an unloading mechanism which is entirely practical and which may be used intermittently without locking up or jamming of the unloading mechanism. The walls of the metering channels are spaced a uniform distance apart throughout their height to prevent material from wedging up inside the channels. The grid system comprised of control bar members 54 serves to sift out foreign objects which otherwise might pass into and become wedged inside the metering channels. The series of cover members making up the hood structure for each of the tunnels are independently removable from over the top of the tunnels, presenting easy access into the tunnels in the event of breakdown. Spacer elements 51 along the lower edges of the feed slots, while spacing the plate members and the metering channel, also assist in controlling the flow of material into the conveyer tunnels. Degradation and breakdown of material handled is reduced to a minimum, and the entire construction is readily installed in existing barges or cargo vessels with a very small conversion cost.

It is claimed and desired to secure by Letters Patent:

1. In combination with a material storage bin, unloading mechanism comprising an elongated conveyer tunnel along the base of said bin, said conveyer tunnel having a floor, side walls defining the lateral expanse of the tunnel and an overlying hood structure, a pair of conveyer screws mounted side by side inside said tunnel extending substantially the length of said tunnel and operable in concert to move material lodged intermediate said screws, feed slots formed in the side walls of said tunnel, one of said feed slots extending longitudinally along each side of said tunnel, respectively, proximate the outer side of one of said conveyer screws, and an elongated metering channel communicating with each of said feed slots and running substantially the length of said tunnel above each of said feed slots, the walls defining each of said metering channels being spaced substantially a uniform distance apart throughout the height of the channel, said storage bin having wall portions directing material contained in the bin into the upper ends of said metering channels.

2. In combination with a material storage bin, unloading mechanism comprising an elongated conveyer tunnel along the base of said bin, said conveyer tunnel having a floor, side walls defining the lateral expanse of the tunnel and an overlying hood structure, said hood structure having top deflecting surfaces sloping downwardly to either side of said conveyer tunnel, a pair of parallel conveyer screws mounted side by side inside said tunnel extending substantially the length of said tunnel and operable in concert to move material lodged intermediate said screws, feed slots formed in the side walls of said tunnel, one of said feed slots extending longitudinally along each side of said tunnel, respectively, proximate the outer side of one of said conveyer screws, and an elongated metering channel communicating with each of said feed slots and running substantially the length of said tunnel above each of said feed slots, the walls defining each of said metering channels being spaced substantially a uniform distance apart throughout the height of the channel, said storage bin having wall portions co-operating with the surfaces of said hood structure in directing material contained in the bin into the upper ends of said metering channels.

3. In combination with a material storage bin, unloading mechanism comprising an elongated conveyer tunnel along the base of said bin, said conveyer tunnel having a floor, side walls defining the lateral expanse of the tunnel and an overlying hood structure, said hood structure being comprised of a series of cover members arranged end to end along the length of said tunnel, each of said cover members being removable from over the top of said tunnel, the top of each of said cover members having surfaces sloping downwardly and outwardly to either side of said conveyer tunnel, a pair of conveyer screws mounted side by side inside said tunnel extending substantially the length of said tunnel and operable in concert to move material lodged intermediate said screws, feed slots formed in the side walls of said tunnel, one of said feed slots extending longitudinally along each side of said tunnel, respectively, proximate the outer side of one of said conveyer screws, and an elongated metering channel communicating with each of said feed slots and running substantially the length of said tunnel above each of said feed slots, the walls defining each of said metering channels being spaced substantially a uniform distance apart throughout the height of the channel, said storage bin having wall portions co-operating with the surfaces of said hood structure in directing material contained in the bin into the upper ends of said metering channels.

4. A bin having an unloading mechanism therefor comprising a bin bottom and side walls forming the storage space for said bin, an elongated conveyer tunnel arranged centrally along the base of said bin, said conveyer tunnel having a floor, side walls defining the lateral expanse of the tunnel and an overlying hood structure, a pair of parallel conveyer screws mounted side by side inside said tunnel extending substantially the length of said tunnel and operable in concert to move material lodged intermediate said screws, feed slots formed in the side walls of said tunnel, one of said fed slots extending longitudinally along each side of said tunnel, respectively, proximate the outer side of one of said conveyer screws, an elongated metering channel communicating with each of said feed slots and running substantially the length of said tunnel above each of said feed slots, the walls defining each of said metering channels being spaced a substantially uniform distance apart throughout the height of the channel, the bottom of said bin inclining upwardly and outwardly from the upper end of each of said metering channels, said hood structure having deflecting surfaces inclining downwardly to either side of said conveyer tunnel, said deflecting surfaces and the bottom of said bin funneling material into the upper ends of said metering channels, and a series of control bar elements arranged transversely across the upper end of each of said metering channels and at regularly spaced intervals therealong operable to sift material entering into said metering channels.

5. A bin having an unloading mechanism therefor comprising a bin bottom and side walls forming the storage space for said bin, an elongated conveyer tunnel arranged centrally along the base of said bin, said conveyer tunnel having a floor, side walls defining the lateral expanse of the tunnel and an overlying hood structure, a pair of parallel conveyer screws mounted side by side inside said tunnel extending substantially the length of said tunnel and operable in concert to move material lodged intermediate said screws, feed slots formed in the side walls of said tunnel, one of said feed slots extending longitudinally along each side of said tunnel, respectively, proximate the outer side of one of said conveyer screws, an elongated metering channel communicating with each of said feed slots and running substantially the length of said tunnel above each of said feed slots, and a series of leveler members arranged at regularly spaced intervals along each of said feed slots, the lower ends of each of said leveler members protruding below the feed slot into said conveyer tunnel and being operable to level out waves set up on the material by the conveyer screws, the bottom of said bin inclining upwardly and outwardly from the upper end of each of said metering channels so as to present a continuous incline from the sides of the bin to the conveyer tunnel, said hood structure having deflecting surfaces co-operating with the bottom of said bin in directing material contained in the bin into the upper ends of said metering channels.

6. In combination with a material storage bin, unloading mechanism comprising an elongated conveyer tunnel along the base of said bin, said conveyer tunnel having a floor, side walls defining the lateral expanse of the tunnel, and an overlying hood structure, said hood structure being comprised of a series of cover members arranged end to end along the length of said tunnel, each of said cover members being removable from over the top of said tunnel, the top of each of said cover members having surfaces sloping downwardly and outwardly to either side of said conveyer tunnel, a pair of parallel conveyer screws mounted side by side inside said tunnel extending substantially the length of said tunnel and operable in concert to move material lodged intermediate said screws, feed slots formed in the side walls of said tunnel, one of said feed slots extending longitudinally along each side of said tunnel, respectively, proximate the outer side of one of said conveyer screws, an elongated metering channel communicating with each of said feed slots and running substantially the length of said tunnel above each of said feed slots, the walls defining each of said metering channels being spaced substantially a uniform distance apart throughout the height of the channel, said storage bin having wall portions directing material contained in the bin into the upper ends of said metering channels, a series of leveler members arranged at regularly spaced intervals along each of said feed slots, the lower ends of each of said leveler members protruding into said conveyer tunnel and being operable to level out waves set up in the material by the conveyer screws, and a series of control bar elements arranged transversely across the upper end of each of said metering channels and at regularly spaced intervals therealong operable to sift material entering into said metering channels.

7. A bin having an unloading mechanism therefor comprising a bin bottom and side walls forming the storage space for the bin, an elongated conveyer tunnel arranged centrally along the base of said bin, said conveyer tunnel having a floor, side walls defining the lateral expanse of the tunnel and an overlying hood structure, said hood structure being comprised of a series of cover members arranged end to end along the length of said tunnel, a pair of conveyer screws mounted side by side inside said tunnel extending the length of said tunnel and operable in concert to move material lodged intermediate said screws, feed slots formed in the side walls of said tunnel, one of said feed slots extending longitudinally along each side of said tunnel, respectively, proximate the outer side of one of said conveyer screws, an elongated metering channel communicating with each of said feed slots running substantially the length of said tunnel above each of said feed slots, the walls defining each of the metering channels being spaced a substantially uniform distance apart throughout the height of the channel, a series of leveler members arranged at regularly spaced intervals along each of said feed slots, the lower ends of each of said leveler members protruding into said conveyer tunnel and being operable to level out waves set up in the material by the conveyer screws, the bottom of said bin inclining upwardly and outwardly from the upper end of each of said metering channels so as to present a continuous incline from the sides of the bin to the conveyer tunnel, said cover members having deflecting surfaces co-operating with the bottom of said bin in funneling material into the upper ends of said metering channels, and a series of control bar elements arranged transversely across the upper end of each of said metering channels and at regularly spaced intervals therealong operable to sift material entering into said metering channels.

8. In a cargo vessel a cargo bin and unloading mechanism comprising a bin bottom and walls forming an elongated storage space evenly distributed to either side of the keel for the vessel, an elongated conveyer tunnel providing an unloading passage means along the base of said bin extending longitudinally substantially over the keel for the vessel, said conveyer tunnel having a floor, side walls defining the lateral expanse of the tunnel and an overlying hood structure, a pair of conveyer screws mounted side by side inside said tunnel extending substantially the length of said tunnel, and a feed slot extending longitudinally substantially the length of the tunnel along each side of the tunnel, said feed slots discharging material into the tunnel along the outer sides of the conveyer screws, said hood structure having deflecting surfaces inclining downwardly to either side of said conveyer tunnel, the bottom of said bin sloping downwardly from the lateral sides of the bin to said conveyer tunnel, said deflecting surfaces and bottom funneling material into said feed slots to be fed into said conveyer tunnel so that upon operation of said conveyer screws substantially equal amounts of material are removed from either side of the keel of the vessel, said feed slots accommodating the removal of material from the bin simultaneously from areas distributed throughout the length of the conveyer tunnel, said conveyer tunnel constituting along its length substantially the only unloading passage means for said bin between the lateral sides of the bin, and having a cross section of relatively minor size compared to the cross section of said bin.

9. In a cargo vessel a cargo bin and unloading mechanism comprising a bin bottom and walls forming an elongated storage space evenly distributed to either side of the keel for the vessel, an elongated conveyer tunnel along the base of said bin extending longitudinally substantially over the keel for the vessel, said conveyer tunnel having a floor, side walls defining the lateral expanse of the tunnel and an overlying hood structure, a pair of conveyer screws mounted side by side inside said tunnel extending substantially the length of said tunnel, a feed slot extending longitudinally substantially the length of the tunnel along each side of the tunnel, said feed slots discharging material into the tunnel along the outer sides of the conveyer screws, and an elongated metering channel communicating with each of said feed slots and running substantially the length of said tunnel above each of said feed slots, the walls defining each of said metering channels being spaced a substantially uniform distance apart throughout the height of the channel, said hood structure having deflecting surfaces inclining downwardly to either side of said conveyer tunnel, the bottom of said bin sloping downwardly from the lateral sides of the bin to said conveyer tunnel, said deflecting surfaces and bottom funneling material into said metering channels to be fed into said conveyer tunnel so that upon operation of said conveyer screws substantially equal amounts of material are removed from either side of the keel of the vessel, said feed slots accommodating the removal of material from the bin simultaneously from areas distributed throughout the length of the conveyer tunnel.

10. In a cargo vessel a cargo bin and unloading mechanism comprising a bin bottom and walls forming an elongated storage space extending longitudinally of the vessel with an even distribution of the storage space to either side of the keel for the vessel, a pair of elongated conveyer tunnels, one at each end of the bin, providing an unloading passage means and extending longitudinally along the vessel substantially over its keel, each of said conveyer tunnels having a floor, side walls defining the lateral expanse of the tunnel and an overlying hood structure, a pair of conveyer screws mounted side by side inside each of said tunnels extending substantially the length of the tunnel, said conveyer screws depositing material collected in the tunnel in an area intermediate the pair of conveyer tunnels, and a feed slot extending longitudinally along each side of each of said tunnels, said feed slots discharging material into the tunnels along the outer sides of the conveyer screws, the hood structure for each tunnel having deflecting surfaces inclining downwardly to either side of the tunnel, the bottom of said bin sloping downwardly from the lateral sides of the bin to said conveyer tunnels, said deflecting surfaces and bottom funneling material into said feed slots to be fed into said conveyer tunnels so that upon operation of said conveyer screws substantially equal amounts of material are removed from either side of the keel of the vessel, the feed slots for each tunnel accommodating the removal of material from the bin simultaneously from areas distributed throughout the length of the tunnel, each of said pair of conveyer tunnels constituting along its length substantially the only unloading passage means for said bin between the lateral sides of the bin, and each having a cross section of relatively minor size compared to the cross section of said bin.

11. In a cargo vessel a cargo bin and unloading mechanism comprising a bin bottom and walls forming an elongated storage space extending longitudinally of the vessel with an even distribution of the storage space to either side of the keel for the vessel, a pair of elongated conveyer tunnels, one at each end of the bin, providing an unloading passage means and extending longitudinally along the vessel substantially over its keel, each of said conveyer tunnels having a floor, side walls defining the lateral expanse of the tunnel and an overlying hood structure, a pair of conveyer screws mounted side by side inside each of said tunnels extending substantially the length of the tunnel, means for driving said conveyer screws, said means accommodating operation of the pair of screws in one tunnel independently of the pair of screws in the other tunnel, said conveyer screws depositing material collected in the tunnel in a recess formed in the bottom of the bin intermediate the pair of conveyer screws, and a feed slot extending longitudinally along each side of each of said tunnels, said feed slots discharging material into the tunnels along the outer sides of the conveyer screws, the hood structure for each tunnel having deflecting surfaces inclining downwardly to either side of the tunnel, the bottom of said bin sloping downwardly from the lateral sides of the bin to said conveyer tunnels, said deflecting surfaces and bottom funneling material into said feed slots to be fed into said conveyer tunnels so that upon operation of said conveyer screws substantially equal amounts of material are removed from either side of the keel of the vessel, the feed slots for each tunnel accommodating the removal of material from the bin simultaneously from areas distributed throughout the length of the tunnel, each of said pair of conveyer tunnels constituting along its length substantially the only unloading passage means for said bin between the lateral sides of the bin, and each having a cross section of relatively minor size compared to the cross section of said bin.

12. In a cargo vessel a cargo bin and unloading mechanism comprising a bin bottom and walls forming an elongated storage space extending longitudinally of the vessel with an even distribution of the storage space to either side of the keel for the vessel, a pair of elongated conveyer tunnels, one at each end of the bin, extending longitudinally along the vessel substantially over its keel, each of said conveyer tunnels having a floor, side walls defining the lateral expanse of the tunnel and an overlying hood structure, said hood structure comprising a series of cover members which are removable from over the top of the tunnel, a pair of conveyer screws mounted side by side inside each of said tunnels extending substantially the length of the tunnel, means for driving said conveyer screws, said means accommodating operation of the pair of screws in one tunnel independently of the pair of screws in the other tunnel, said conveyer screws depositing material collected in the tunnel in a recess formed in the bottom of the bin intermediate the pair of conveyer screws, a feed slot extending longitudinally along each side of each of said tunnels, and an elongated metering channel of uniform width throughout its height communicating with each of said feed slots, said feed slots discharging material into the tunnels along the outer sides of the conveyer screws, the hood structure for each tunnel having deflecting surfaces inclining downwardly to either side of the tunnel, the bottom of said bin sloping downwardly from the lateral sides of the bin to said conveyer tunnels, said deflecting surfaces and bottom funneling material into the metering channels to be fed into said conveyer tunnels so that upon operation of said conveyer screws substantially equal amounts of material are removed from either side of the keel of the vessel, the metering channels and feed slots for each tunnel accommodating the removal of material from the bin simultaneously from areas distributed throughout the length of the tunnel.

References Cited in the file of this patent

UNITED STATES PATENTS

| | | |
|---|---|---|
| 645,747 | Hohmann | Mar. 20, 1900 |
| 993,294 | Edison | May 23, 1911 |
| 1,164,934 | Dull | Dec. 31, 1915 |
| 1,467,041 | Johnson | Sept. 4, 1923 |